United States Patent
Levey et al.

(10) Patent No.: US 7,326,014 B2
(45) Date of Patent: Feb. 5, 2008

(54) INTERACTIVE FIT SCREW THREAD

(75) Inventors: Kenneth R. Levey, West Chicago, IL (US); Frank W. Bechtel, Jr., Roscoe, IL (US); Michael P. Glynn, Broadview, IL (US)

(73) Assignee: Illinois Tool Works, Inc, Glenview, IL (US)

( * ) Notice: Subject to any disclaimer, the term of this patent is extended or adjusted under 35 U.S.C. 154(b) by 1 day.

(21) Appl. No.: 11/092,223

(22) Filed: Mar. 29, 2005

(65) Prior Publication Data

US 2005/0238459 A1 Oct. 27, 2005

Related U.S. Application Data

(60) Provisional application No. 60/582,381, filed on Jun. 23, 2004, provisional application No. 60/580,477, filed on Jun. 17, 2004, provisional application No. 60/564,188, filed on Apr. 21, 2004.

(51) Int. Cl.
*F16B 39/30* (2006.01)
*F16B 35/04* (2006.01)

(52) U.S. Cl. ............... 411/308; 411/307; 411/413; 411/411; 411/412

(58) Field of Classification Search ........... 411/307, 411/308, 386, 309, 310, 311, 312, 411, 412, 411/413
See application file for complete search history.

(56) References Cited

U.S. PATENT DOCUMENTS

| | | | | |
|---|---|---|---|---|
| 756,269 | A * | 4/1904 | McMahon | 411/285 |
| 1,070,247 | A * | 8/1913 | Haines | 411/259 |
| 2,349,592 | A * | 5/1944 | Hosking | 411/311 |
| 3,142,239 | A * | 7/1964 | Meixner | 359/829 |
| 3,426,642 | A | 2/1969 | Phipard, Jr. | |
| 3,459,250 | A * | 8/1969 | Tabor | 411/310 |
| 3,481,380 | A * | 12/1969 | Breed | 411/309 |
| 3,661,194 | A | 5/1972 | Macfariane et al. | |
| 3,850,074 | A | 11/1974 | Simons | |
| 3,861,269 | A | 1/1975 | Laverty | |
| 3,885,613 | A * | 5/1975 | Evans | 411/311 |
| 3,927,503 | A * | 12/1975 | Wilson | 411/311 |
| 4,071,067 | A * | 1/1978 | Goldby | 411/307 |
| 4,144,795 | A * | 3/1979 | Gutshall | 411/413 |
| 4,637,767 | A | 1/1987 | Yaotani et al. | |
| 4,818,165 | A | 4/1989 | Shirai | |
| 5,044,853 | A | 9/1991 | Dicke | |

(Continued)

FOREIGN PATENT DOCUMENTS

GB 1209225 10/1970

OTHER PUBLICATIONS

6 Pages, Tru-Flex, SPS-Technologies.

*Primary Examiner*—Fleming Saether
*Assistant Examiner*—David C Reese
(74) *Attorney, Agent, or Firm*—Mark W. Croll; Paul F. Donovan (57) ABSTRACT

A threaded fastener includes a curved-line path thread provided in a helical pattern along a shank of the fastener. The curved-line path can be provided on either side of the standard straight-line path or on opposite sides of the straight-line path. The curved-line path and can be provided on all or a portion of the thread from near the tip end thereof to near the head end thereof.

19 Claims, 4 Drawing Sheets

U.S. PATENT DOCUMENTS

| | | | |
|---|---|---|---|
| 5,194,214 A * | 3/1993 | Snyder et al. | 376/203 |
| 5,921,735 A | 7/1999 | Hughes | |
| 6,296,432 B1 * | 10/2001 | Kato | 411/386 |
| 6,349,466 B1 | 2/2002 | Redler et al. | |
| 6,371,709 B1 * | 4/2002 | Papafotiou et al. | 411/412 |
| 6,450,748 B1 | 9/2002 | Hsu | |
| 6,464,439 B1 * | 10/2002 | Janitzki | 411/308 |
| 6,468,014 B2 | 10/2002 | Chen | |
| 6,676,352 B2 | 1/2004 | Chen-Chi et al. | |
| 6,685,411 B2 * | 2/2004 | Kato | 411/386 |
| 2002/0057551 A1 | 5/2002 | Redler et al. | |
| 2002/0141848 A1 | 10/2002 | Hsu et al. | |

\* cited by examiner

INTERACTIVE FIT SCREW THREAD

CROSS-REFERENCE TO RELATED APPLICATIONS

The present regular United States Patent Application claims the benefits of U.S. Provisional Patent Application Ser. No. 60/564,188 filed Apr. 21, 2004; U.S. Provisional Patent Application Ser. No. 60/580,477 filed Jun. 17, 2004 and U.S. Provisional Patent Application Ser. No. 60/582,381 filed Jun. 23, 2004.

FIELD OF THE INVENTION

The present invention relates generally to threaded fasteners, and, more specifically, the invention relates to thread configurations of threaded fasteners for creating prevailing torque.

BACKGROUND OF THE INVENTION

Simple threaded fasteners include a male threaded component and a female threaded component configured to engage one with another to affix multiple items to each other. According to the Industrial Fasteners Institute (IFI), a thread is defined as a uniform section in the form of a helix on the external or internal surface of a cylinder. It is known to provide either straight or parallel threads formed on a cylinder or tapered thread formed on a frustum or cone. Threaded fasteners are used in widely differing applications, environments and conditions for widely varying purposes. Threaded fasteners are known to be made of many different materials, both soft and hard, including various metals and plastics.

To improve the performance of threaded fasteners for different purposes, a variety of thread configurations are known such as machine thread forms and spaced thread forms. In general, threads of all types are based on a straight-line helix pattern. The thread pitch may vary from one type or size of fastener to another, and it is known to provide a differing thread pitch on different portions of the same fastener. However, regardless of the pitch the thread follows a straight-line helical pattern.

In a standard fastener design, for a given or "basic" pitch, the male thread is provided at equal to or less than the basic pitch, and the female thread is provided at equal to or more than the basic pitch. The result is that the male thread "floats" within the female thread, allowing the two components to be run together throughout the thread length with little or no interference until clamping pressure is applied during final tightening of the fastener.

As the fastener is tightened and clamp load applied, friction is created from stretch in the fastener as it is placed under tension. Due to vibration, slip of the angular thread surfaces of the fastener over time, expansion and contraction cycles and the like, the clamp load can loosen. It is known to provide prevailing torque in the fastener by deforming the nut or using paste-like substances in the threads to maintain the relative position of the male and female components, even if clamp load is lost. Crimping a nut adds considerable cost to the manufacturing process, and known paste-like substances for the purpose are somewhat limited in extreme temperature conditions and have limited reusability. Prevailing torque thread forms, including plastic inserts typically in the female thread, rely on the crest or root of one fastener interfering with the mating thread of the other fastener. Reliability and repeatability of performance have not been achieved with these designs. Further, prevailing torque provided in this fashion is present throughout the length of threaded engagement between the male and female component, requiring additional torque throughout rotation. Prevailing torque constructions have been undesirably expensive to manufacture.

It is generally accepted in fastener design that up to 80% of the all tension is absorbed in the first three threads of the fastener. Accordingly, fastener designers must account for this feature. It would be advantageous to distribute tension more evenly throughout the entire length of the engaged fasteners, or at least more substantial portions thereof.

Further difficulties occur when threaded fasteners are used in somewhat non-standard situations. Tightening the fastener requires application of clamp load, meaning the head of the fastener, the confronting surface of the female fastener and all materials or components therebetween are compressed together. In so called "soft joints" such as, for example, joints holding together elastic materials, gaskets or the like, it is desirable that the fastener joint be tight without excessive clamp force applied on the material being held. Shoulder bolts or standard fasteners with spacers have been used for this purpose, complicating assembly and increasing costs.

Threaded fasteners are known to be preassembled in components that are designed to be installed with other components or associated members, and thereafter tightened. For example, various electrical assemblies are provided for use in the field with screws already in place on terminals to receive wires therein. With the wire properly positioned, the screw is tightened to establish electrical connection between the wire and the electrical assembly. The pre-installed position of the screw must be relatively secure so that the screw does not become lost, making the component unusable. Various interference or prevailing torque configurations are known to hold the screw position, but have the undesirable effect of increasing the torque required for turning the screw throughout its length. This makes preassembly and final tightening more difficult. It is also know to preassemble such devices by running the screw in until it bottoms out and can be tightened. This has the disadvantage of requiring that the screw is backed out before installation and use can commence. This can be both time consuming and difficult.

What is needed is a screw thread form that provides prevailing torque to keep fasteners tight and that can be used to preposition a male fastener relative to a female fastener for preassembled field ready components.

SUMMARY OF THE INVENTION

The present invention provides a curved thread pitch on all or a small portion of the thread, to establish prevailing torque along desired portions of the fastener that can be used to preposition fasteners or to provide prevailing torque when the fastener is tightened.

In one aspect thereof, the present invention provides a threaded fastener with a shank and a thread on the shank having a thread crest and a thread root. The thread is disposed in a generally helical pattern along the shank. At least a portion of the thread follows a curved-line path. The curved-line path deviates from a straight-line helical path while following the generally helical pattern, such that the thread crest and the thread root follow a similarly curved path within the portion.

In another aspect thereof, the present invention provides a male threaded fastener with a shank. A thread including a thread crest and a thread root has at least a portion thereof following a curved-line path in the shape of a sinusoidal wave. The thread is disposed on said shank in a helical pattern.

In a still further aspect thereof, the present invention provides an assembly with a first component having an internally threaded opening and an externally threaded component threadedly engaged in the opening. The externally threaded component includes a shank and an external thread on the shank having a thread crest and a thread root. The external thread is disposed in a generally helical pattern along the shank. At least a portion of the external thread follows a curved-line path. The curved-line path deviates from a straight-line helical path while following the generally helical pattern. The thread crest and the thread root following a similarly curved path within the portion.

An advantage of the present invention is providing a threaded fastener that can be pre-positioned in a field-ready position relative to a female threaded component, and that will stay firmly in place without substantial increase of torque required for pre-assembly or torque required for final run-up to tightening, relative to known fasteners.

Another advantage of the present invention is providing a threaded fastener with prevailing torque that is repeatable and reusable.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
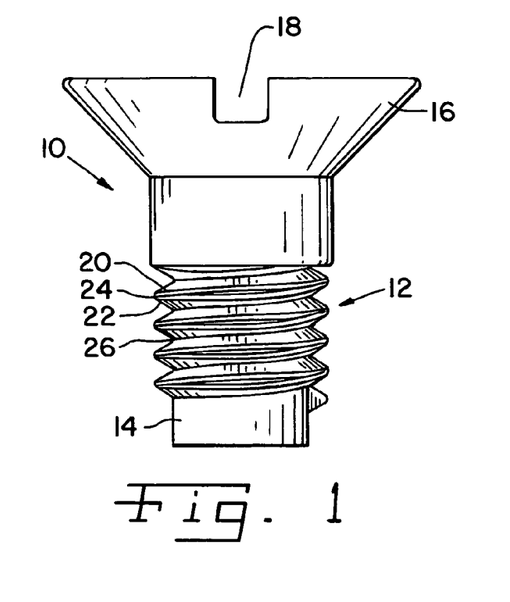
FIG. 1 is an elevational view of a threaded fastener having an interactive fit screw thread in accordance with the present invention.

Referring now more specifically to the drawings and to FIG. 1 in particular, numeral 10 designates a fastener, and more specifically a screw having an interactive fit screw thread 12 in accordance with the present invention. Screw 10 includes a shank 14 and a head 16 at one end of shank 14.

In the exemplary embodiment illustrated, head 16 is configured for engagement by a screwdriver, head 16 having a slot 18 formed therein. Those skilled in the art will readily understand that head 16 can be otherwise configured than with a straight slot 18. Thus, head 16 can be configured with a cavity for receiving a Phillips screwdriver, torx driver, hex driver or the like. Further, the outer peripheral shape of head 16 can be configured for engagement by a wrench, rather than for engagement with a screwdriver.

Interactive fit screw thread 12 of the present invention can be used on a variety of styles, shapes and sizes of fasteners 10, including a screw 10 as shown or other bolts and threaded fasteners. Interactive fit screw thread 12 also can be used on threaded components or devices other than fasteners. Threads of the present invention have a wide range of use and application.

Thread 12 includes a pressure flank 20 and a trailing flank 22 from a thread crest 24 to a thread root 26. Thread 12 is disposed in a generally helical pattern along shank 14, and may extend substantially full length of fastener 10, or may begin or end some distance spaced from ends of the fastener.

Threads of standard fasteners commonly follow a straight-line helical path within the helical pattern. In contrast, thread 12 does not follow a continuous straight-line path within the generally helical pattern. Thread 12 follows a curved-line path disposed on shank 14 in a helical pattern. The curved, helical path of thread 12 is shown in the form of a sinusoidal wave and, in the embodiment illustrated in FIG. 1, provides one period for each revolution of the helical pattern.

Figure 2:
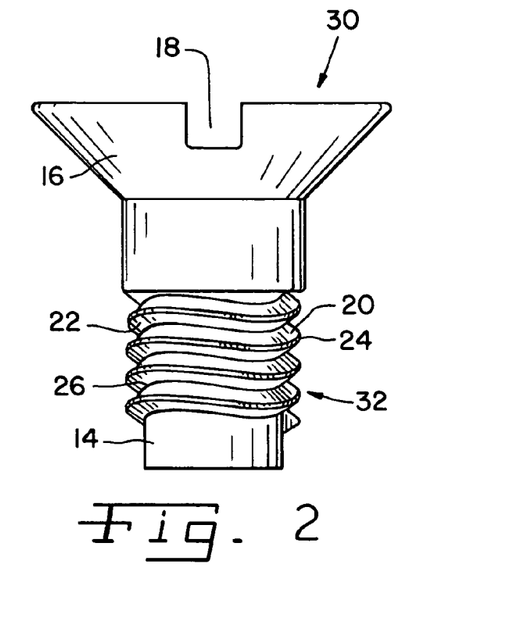
FIG. 2 is an elevational view similar to that of FIG. 1, but illustrating a different thread form in accordance with the present invention.

FIG. 2 illustrates a similar screw 30; however, an interactive fit screw thread 32 thereof differs from thread 12 in that thread 32 follows a curved path in the shape of a sinusoidal wave including two wave periods per revolution of the helical pattern. The increased frequency of the wave is more clearly apparent in FIG. 2 than in FIG. 1. Thread 32 similarly includes pressure flank 20, trailing flank 22 thread crest 24 and thread root 26.

The present invention differs from prior structures in which the thread form is deformed. In the present invention, the thread form remains the same in cross-sectional shape throughout the curved path. Thus, the relationship between pressure flank 20, trailing flank 22 and crest 24 is the same throughout the curved-line path of the thread and also in the straight-line portions (if any) of the thread. Throughout the helical pattern, the cross-sectional shape remains the same. However, the entire thread from root 26 to crest 24 follows a curved path within the helical pattern. Thus, root 26 similarly follows a curved-line path in a generally helical pattern along shank 14.

Figure 3:
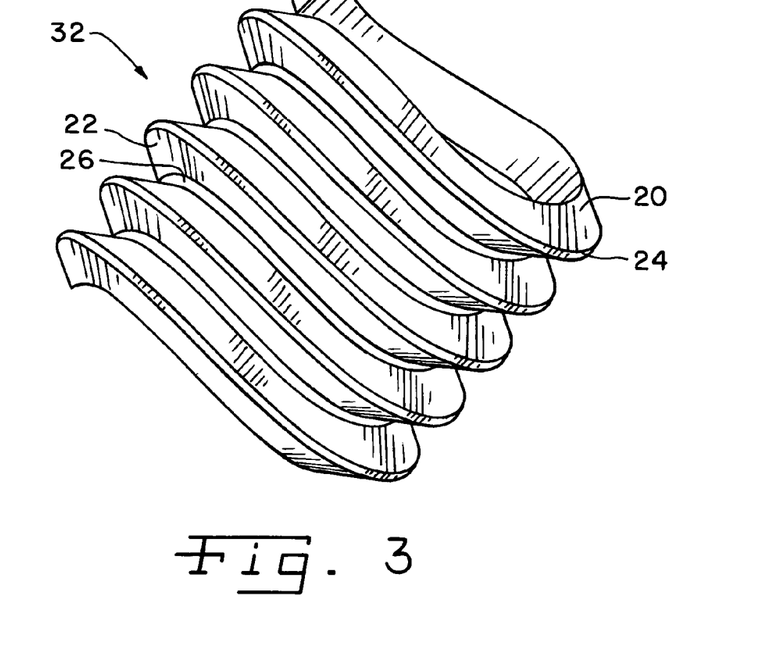
FIG. 3 is an enlarged perspective illustration of a thread form in accordance with the present invention, without the bolt shank being shown, to better illustrate the full circumference of the thread.

To better illustrate the shape and configuration of threads in accordance with the present invention, reference is made to FIG. 3, which illustrates thread 32 without shank 14 and in enlarged view. While it is to be understood that interactive fit screw threads of the present invention and shanks on which the thread is formed frequently are monolithic bodies, FIG. 3 is provided to more clearly illustrate the complete circumferential shape of thread 32. As can be seen in FIG. 3, throughout the curved-line path of thread 32, and throughout the helical pattern, the cross-sectional shape remains the same. The relationship between crest 24, pressure flank 20 and trailing flank 22 remain the same.

Thread forms in accordance with the present invention can be created to provide prevailing torque or friction in a threaded joint. A continuously changing or variable pitch allows for line-to-line contact between male and female threads. Adding friction to the threaded joint allows the harder screw thread to cold form a more ductile nut thread into a matching shape that will not loosen from vibration. It is common that screw material is harder than the material of the female component or nut in which it is engaged. Thus, damage to screw threads, even with an interactive fit thread in accordance with the present invention, is limited, and the threaded male fastener can be reused.

FIG. 1 illustrates interactive fit screw thread 12 with one wave period per revolution along the helical pattern, and FIGS. 2 and 3 illustrate thread 32 with two wave periods per revolution of the helical thread pattern. It should be understood that three or more periods can be provided per single revolution along the helical pattern. It is not required that complete wave periods be provided in a single helical revolution of the helical pattern. Further, while threads 12 and 32 are illustrated as continuously curved, threads in accordance with the present invention can have curved-line portions and straight-line portions. Thus, screw designers utilizing the present invention can design desired characteristics into the threaded joint which are not possible with standard thread forms following straight-line helical paths.

Figure 4:
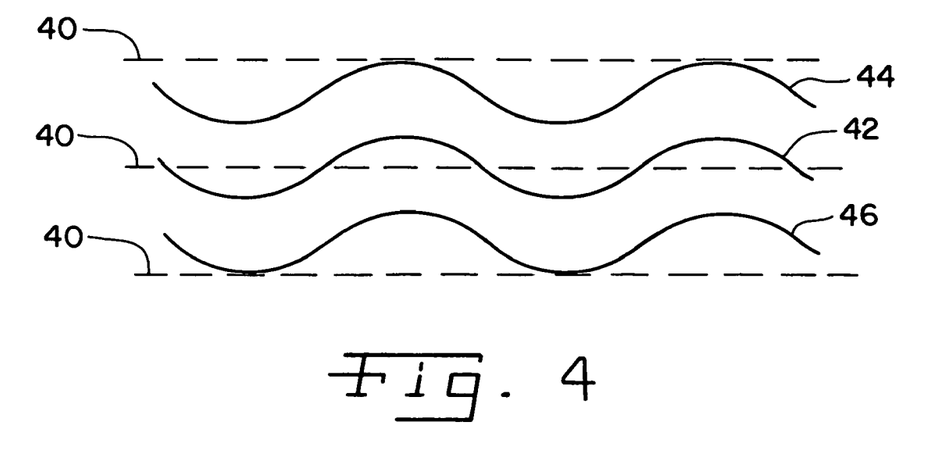
FIG. 4 is a graphic representation of thread forms in accordance with the present invention.

FIG. 4 is a graphical illustration of the manner in which some curved-line portions for threads in accordance with the present invention can vary from the straight-line thread paths of standard fasteners. Dashed lines 40 in FIG. 4 represent straight-line thread paths, which are arranged in helical patterns on a fastener. A curved-line thread path in the shape of a sinusoidal wave represented by line 42 deviates from straight-line thread path 40 on both sides thereof. Hence, the curved-line path followed by a thread form represented by line 42 curves away from and toward the straight-line path of a standard thread form represented by dashed line 40, both toward the head and toward the distal tip of a fastener on which it is found. Curved-line thread path 42 is illustrated deviating from straight-line thread path 40 equally on opposite sides. It is anticipated that in some uses, curved-line thread paths of the present invention may deviate unequally on opposite sides of the straight-line standard thread path.

Interactive fit screw threads in accordance with the present invention can deviate from the standard straight-line thread path 40 in only one direction as well. Thus, a curved-line thread path represented by line 44 deviates on one side of straight-line thread path 40, and a curved-line thread path represented by line 46 deviates from straight-line thread path 40 on the opposite side thereof. If a head of the fastener represented in FIG. 4 is above the graph, and distal tip of the fastener below the graph, a curved-line thread path represented by line 44 deviates from straight-line thread path represented by line 40 towards the tip and away from the head. A curved-line thread path represented by line 46 deviates from a straight-line thread path represented by line 40 toward the head and away from the distal tip.

Figure 5:
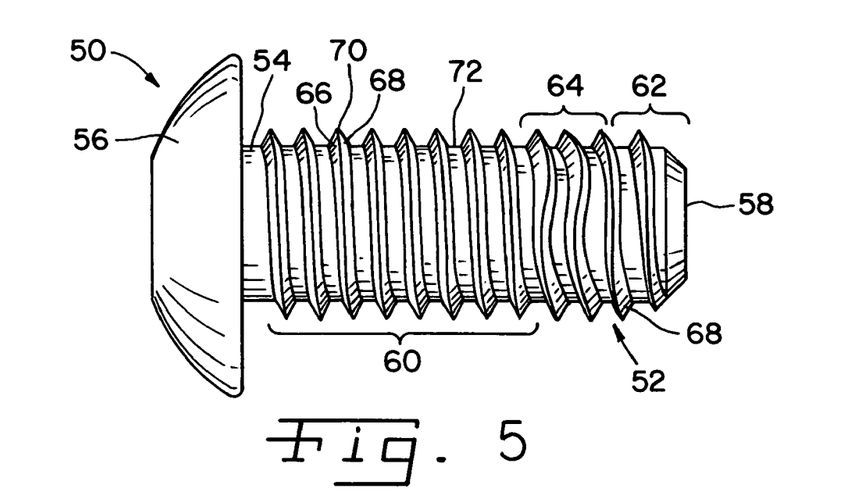
FIG. 5 is an elevational view of a male fastener having an interactive fit screw thread in accordance with the present invention.

Curved-line thread paths in accordance with the present invention can be provided substantially the entire length of a thread on a fastener. However, curved-line thread paths in accordance with the present invention can advantageously be applied to portions less than the entire length of the thread. FIG. 5 illustrates a fastener 50 having a thread 52 on shank 54. A head 56 and distal tip 58 are provided on opposite ends of shank 54. Thread 52 includes a standard straight-line thread path portion 60 near head 52 and a standard straight-line thread path portion 62 near distal tip 56. An intermediate thread portion 64 including three helical revolutions of thread 52 follows a curved thread path within the helical pattern. Thread 52 includes a pressure flank 66 and a trailing flank 68 between a thread crest 70 and a thread root 72, all of which follow substantially straight-line paths through portions 60 and 62 and follow similarly curved-line paths through curved-line portion 64.

Fastener 50 can be made in a variety of sizes and general helical thread pitches as needed for given applications. In a standard female threaded opening, fastener 50 will start easily in that initial standard straight-line thread path portion 62 is provided near distal tip 56. Fastener 50 will start freely along portion 62. When curved-line thread path portion 64 enters the female threaded opening, increased torque is required to rotate fastener 50. Thus, with curved-line thread path portion 64 engaged with the female fastener, fastener 50 will stay in position during handling and shipping. Thereafter, when fastener 50 is rotated yet further, and curved-line thread path portion 64 rotates through the female threaded fastener, standard straight line thread path portion 60 becomes engaged with the female threads, and fastener 50 becomes again free running.

Figure 6:
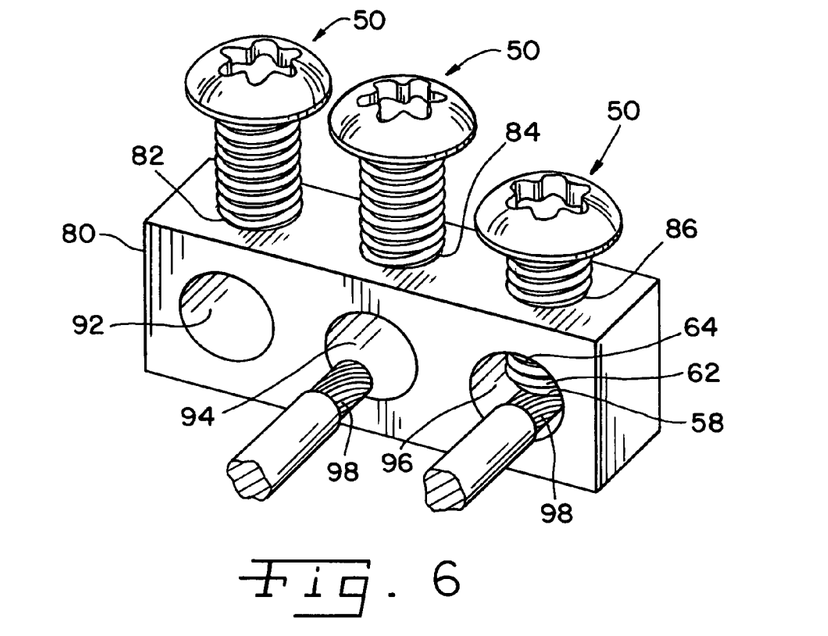
FIG. 6 is a perspective view of an electrical component utilizing interactive fit screw thread fasteners of the present invention.

FIG. 6 illustrates one structure in which fasteners 50 can be used advantageously. An electrical connection block 80 has female threaded openings 82, 84 and 86, and a threaded fastener 50 in each opening 82, 84, 86. Wire receiving holes 92, 94 and 96 intersect with threaded openings 82, 84, 86, respectively, and are configured to receive wire ends 98 therein. Block 80 can be pre-assembled with fasteners 50 in openings 82, 84, 86 so that the curved-line thread path portions 64 of all fasteners 50 are engaged with the threaded openings 82, 84, 86. With proper positioning of curved-line thread path portion 64 relative to distal tip 58, fasteners 50 are held securely in position such that distal tips 58 do not extend into wire receiving holes 92, 94, 96. Interference is created between the curved-line thread path portions 64 and the mating internal threads of openings 82, 84, 86 such that fasteners 50 are tightly held in a field ready position. Wire ends 98 can be fully inserted into wire receiving holes 92, 94, 96 without interference from distal tips 58 of fasteners 50. With a wire end 98 properly inserted, the associated fastener 50 is tightened against wire end 98 to establish electrical contact. Even though each fastener 50 is held securely in the field ready position, after slight rotation to advance curved-line thread path portion 64 beyond the mating female threads, fastener 50 is again relatively freely rotatable. Final tightening of fastener 50 against wire end 98 is achieved without undue torque required.

The sinusoidal wave amplitude is slightly larger than the internal thread groove width to create the desired increased friction along curved-line thread path portion 64. In one embodiment, the sinusoidal wave curved-line portion 64 deviates from the standard straight-line path on both sides thereof, as represented by line 42 illustrated in FIG. 4. The curved-line thread path portion does not deform the mating internal threads of block 50, but merely frictionally engages both the leading and trailing thread flanks without causing the mating material to enter plastic deformation. The sinusoidal thread path provides valleys that are a natural relief between the peaks engaging the female threads. Unlike other known interference fit threads, fasteners 50 do not create interference between the thread crests of one and thread roots of the other, but instead provide engagement along the pressure and trailing flanks. The major and minor diameters of fastener 50 remain constant throughout the length thereof, and fasteners 50 can be used repeatedly without appreciable degradation in performance either of the standard thread path portions 60, 62 or the curved-line thread path portion 64. Block 80 also can be reused in that fasteners 50 do not distort threads in openings 82, 84 and 86.

Another advantageous use of the present invention is for various calibration or adjustment screws that are to remain in an adjusted position without creeping. A fastener having a curved-line thread path portion along a significant portion of the overall length of the thread is useful as a calibration screw or as a locking screw. The axial position of such a screw, relative to the mating female thread in which it is engaged, remains as set, even under vibration or other conditions that commonly loosen such devices. The screw can be adjusted along the length of the curved-line thread path portion and will remain as adjusted or as re-adjusted. Multiple re-adjustments can be made without appreciable degradation of the retention in the female component. Thus, screws of the present invention can be used as calibration or set screws with common or standard female threaded portions and do not require specially engineered internal screw threads to maintain the axial position of the male threaded adjustment member. Threaded components having threads in accordance with the present invention can be provided as retrofit pieces, without the need to change the threaded member associated with it. Accordingly, a calibration screw or setscrew of the present invention is easily installed as a retrofit to improve the adjustment reliability of the device in which it is installed.

Curved-line thread paths of the present invention can be engineered and mass-produced to fit a wide variety of needs. The frequency, amplitude, location and duration of the wave forms in the curved-line helical thread can be varied to suit hard or soft mating nut member materials and to change the behavior sequence of the fastener, such as when the fastener is free-running or when it is under prevailing torque conditions. Multiple free-running lengths and multiple friction or prevailing torque zones can be used. The curved-line thread path portion can be provided to establish a prevailing torque zone intermediate the head and distal ends of the fastener, and can be provided as a prevailing torque region near the head of the fastener to become engaged during final tightening of the fastener. Thus the male fastener can be tightened or secured relative to the female threaded component, without applying a tight clamp force on materials held thereby. Fasteners of the present invention are useful for so-called "soft joints."

Fasteners of the present invention can be made of a variety of materials, both metal and plastic, as are known standard fasteners. Finishing and coating treatments can be used, similarly to known standard fasteners.

Amplitude and frequency variations in the curved-line thread path portions can be used and selected to achieve desired results. A low-amplitude curve in the curved-line thread path portion does not change significantly the torque required during assembly, but affects the interaction between the external and internal threads after clamp load is applied in final tightening. Once clamp load is applied, line contact is established between the peaks of the curved external thread component and the straight-line helical internal thread of the female fastener. Pressure in the joint is directed toward the head of the fastener, thereby providing improved retention under load. Since the cross-sectional configuration of the thread remains constant throughout the curved-line portion, line contact is maintained between the male fastener thread and the female fastener thread from the root to the crest. Thus, contrary to distorted thread configurations in which essentially point-to-point contact is created, the present invention provides elongated straight-line contact for improved force distribution.

Figure 7:
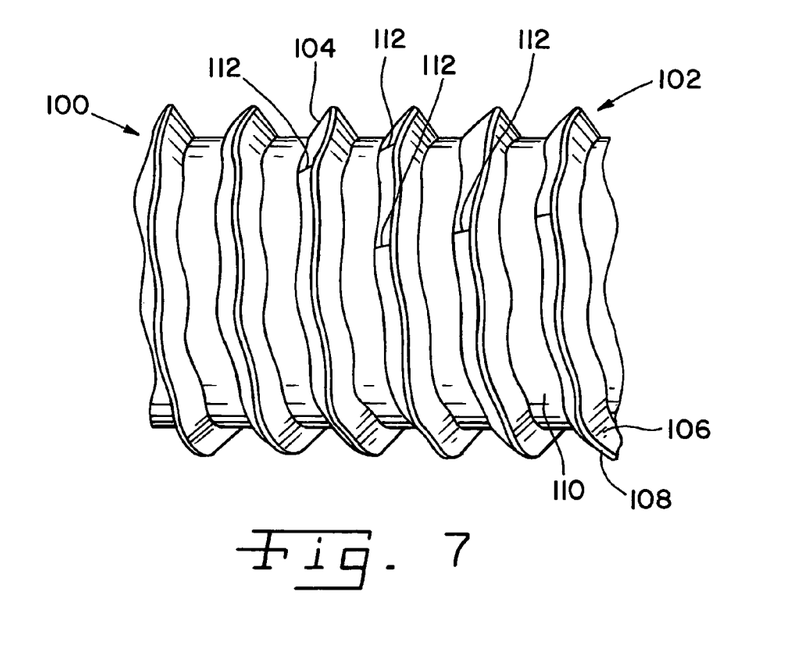
FIG. 7 is an elevational view of a portion of a threaded fastener having interactive fit screw threads in accordance with the present invention.

FIG. 7 illustrates a fastener 100 having a interactive fit thread 102 with a pressure flank 104, a trailing flank 106, a thread crest 108 and a thread root 110. Peaks of the curves within the curved path portion establish line contact with a mating female thread (not shown) from thread crest 108 to thread root 110. Some, but not all peaks of thread 102 have been shown with a line 112 along which line contact is made from thread crest 108 to thread root 110. Over time and with temperature variations applied to the joint, a female thread engaged with thread 102 undergoes deformation in the tightened joint to take on the shape of the male thread, thereby increasing prevailing thread torque. The curved-line thread path interaction with the female thread eliminates the common nature of two inclined surfaces sliding or loosening with respect to each other, and thread 102 creates an interlocking fit that does not slide or loosen readily.

A higher amplitude curve in the curved-line thread path portion increases the torque required during assembly and can be used as a prevailing torque feature at various locations throughout the threaded portion of the fastener.

Figure 8:
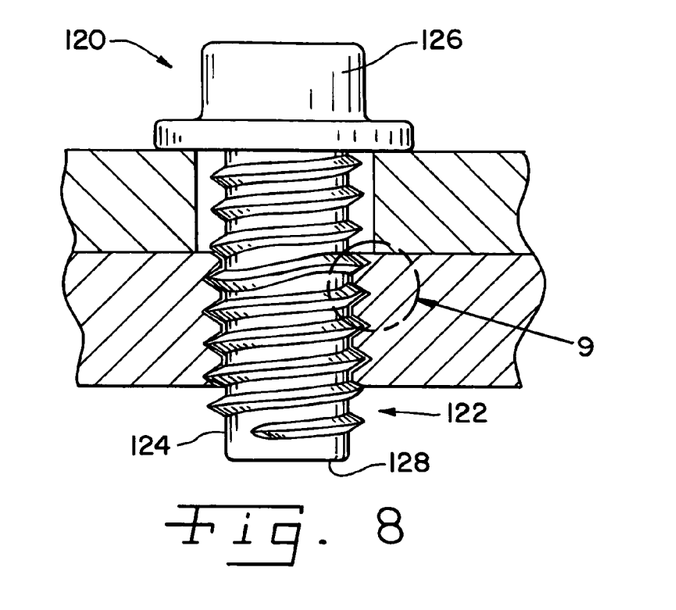
FIG. 8 is an elevational view of a fastener system including a bolt and a female threaded component, the bolt having an interactive fit screw thread in accordance with the present invention.
Figure 9:
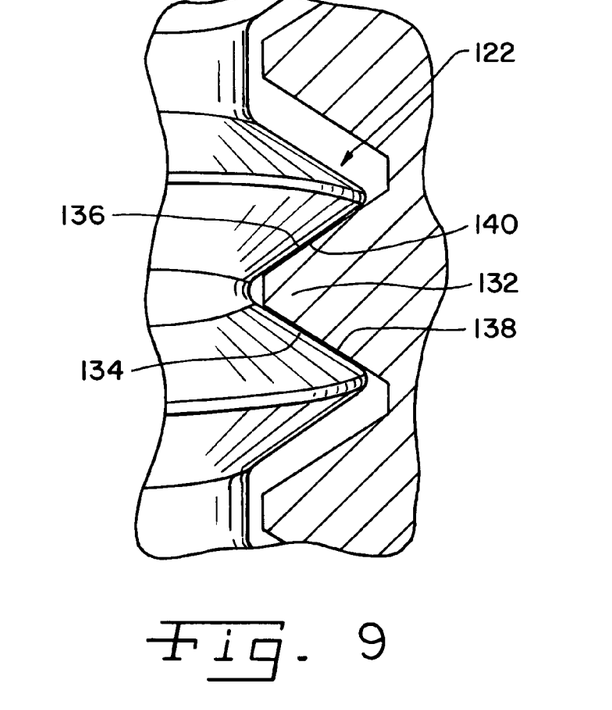
FIG. 9 is an enlarged view of a portion of the fastener system shown in FIG. 8.

FIG. 8 illustrates a fastener 120 having a thread 122 on a shank 124, with a head 126 and a distal tip 128 on opposite ends of shank 124. The enlarged view of FIG. 9, illustrates a curved-line thread path portion 130 of thread 122 engaged with a female thread segment 132 of an associated female component. A pressure flank segment 134 and a trailing flank segment 136 within consecutive revolutions of the helical thread 122 are in substantial axial alignment. Segments 134 and 136 are "out of phase", forming oppositely directed portions of cycles of curved-line thread portion 130. Segments 134 and 136 therefore are engaged against first and second faces 138 and 140, respectively of a single female thread segment 132 in a single revolution of the female thread. With female thread segment 132 held in this fashion between two consecutive revolutions of helical thread 122, the balance of the threaded fastener including straight-line thread path portions are free running, with the male thread substantially centered between and not engaging the female thread. As a result, the torque required to rotate fastener 120 is determined only by the regions of curved-line thread path portions 130 that engage segments 132 of the female thread as fastener 120 is rotated. Accordingly, torque requirements can be precisely controlled through selection of the amplitude and frequency of curves in the curved-line thread path portion. Equally spacing peaks of the curved-line thread portion retains the fastener square in the opening.

The present invention provides the capability of designing a fastener with very low prevailing torque, without risking losing torque entirely. By minimizing the contact area between the curved-line thread path portions 130 and female thread segment 132, while simultaneously holding the balance of the male thread in the clearance area of the mating female thread, very low prevailing torque can be created in that only the area of contact provides prevailing torque. However, even if designed extremely low, the prevailing torque is certain and reliable.

Other variations also are possible consistent with the present invention. For example, a curved path may be provide within a single revolution the helical pattern, or along even less than one revolution. Further, the curved path need not be sinusoidal, and can be of other curve forms. The curve forms need not be consistent but can vary in frequency, amplitude and duration. Straight-line paths can be provided within the curved-line path. Still other variations also are contemplated.

The present invention provides precisely designed threaded fasteners for specific uses and applications, by controlling and varying the prevailing torque of the male fastener in the female fastener. Fastener assemblies can be precisely engineered for their requirements, including providing pre-assembly of male threaded fasteners in female threaded fasteners at positions intermediate the distal tip and head ends of the fastener. Performance of the fastener is both repeatable and reusable.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A threaded fastener comprising:
   a shank having a head at one end thereof and a distal tip at an opposite end thereof;
   a thread on said shank having a thread crest and a thread root, said thread disposed in a generally helical pattern along said shank, said thread further having a pressure flank and a trailing flank from said thread crest to said thread root; and
   at least a portion of said thread following a curved-line path, said curved-line path deviating from a straight-line helical path while following said generally helical pattern, with said thread crest and said thread root following a similarly curved path within said portion, said curved-line path deviating from said straight-line helical path only below said straight-line helical path, said thread following said straight-line helical path having a pitch, and said thread further having an oscillating pitch between said portion of said thread following said curved-line path and an adjacent portion of said thread following said straight-line helical path, such that said oscillating pitch is equal to or less than said pitch with respect to said thread following said straight-line helical path on a side of said straight-line helical path that is closer to said tip than said head, said thread being further configured such that from said thread crest to said thread root, said pressure flank and said trailing flank are substantially linear and maintain a substantially constant cross-sectional shape over at least said portion of said thread following said curved-line path.

2. The fastener of claim 1, said thread having straight-line thread portions on opposite sides of said portion following said curved-line path.

3. The fastener of claim 1, said portion of said thread being nearer said head than said tip.

4. The fastener of claim 1, said portion of said thread comprising substantially all of said thread.

5. The fastener of claim 1, said portion of said thread comprising a single revolution within said helical pattern.

6. The fastener of claim 1, said portion of said thread comprising less than a single revolution within said helical pattern.

7. The fastener of claim 1, said portion of said thread defining a single wave period provided in a revolution within said helical pattern.

8. The fastener of claim 1, said portion of said thread defining at least two wave periods in a revolution within said helical pattern.

9. The fastener of claim 1, said portion of said thread including axially aligned segments of consecutive revolutions in opposite of wave phases.

10. A male threaded fastener comprising:
    a shank having a head at one end thereof and a distal tip at an opposite end thereof;
    a thread disposed on said shank in a generally helical pattern, said thread including a thread crest and a thread root having at least a portion thereof following a curved-line path in the shape of a sinusoidal wave having at least three wave periods per single revolution along said generally helical pattern, such that over said curved-line path, said thread includes a continuously non-linear varying pitch, which is equal to or less than a pitch of said thread following a straight-line helical path on a side of said straight-line helical path that is closer to said tip, said thread further having a pressure flank and a trailing flank from said thread crest to said thread root; and
    said thread being further configured such that from said thread crest to said thread root, said pressure flank and said trailing flank are substantially linear and maintain a substantially constant cross-sectional shape over at least said portion of said thread following said curved-line path in the shape of said sinusoidal wave.

11. The threaded fastener of claim 10, said thread having straight-line path portions on opposite sides of said curved-line path portion.

12. The threaded fastener of claim 10, said portion of said thread including axially aligned segments of consecutive revolutions within said axial pattern in opposite segments of wave phases.

13. The threaded fastener of claim 10, said curved line path provided in multiple revolutions of said helical pattern.

14. The threaded fastener of claim 10, said curved line path provided in a single revolution of said helical pattern.

15. An assembly comprising;
    a first component having an internally threaded opening; and
    an externally threaded component engaged in said opening, said externally threaded component including:
    a shank having a head at one end thereof and a distal tip at an opposite end thereof;
    an external thread on said shank having a thread crest and a thread root, said external thread disposed in generally helical pattern along said shank, said thread further having a pressure flank and a trailing flank from said thread crest to said thread root; and
    at least a portion of said external thread following a curved-line path, said curved-line path deviating from a straight-line helical path while following said generally helical pattern, with said thread crest and said thread root following a similarly curved path within said portion, said curved-line path being in a form of a sinusoidal wave having at least three wave periods per single revolution along said generally helical pattern, said curved-line path deviating from said straight-line helical path only towards said tip and away from said head, said thread having an oscillating pitch between said portion of said thread following said curved-line path and an adjacent portion of said thread following said straight-line helical path, such that said oscillating pitch is equal to or less than a pitch of said thread following said straight-line helical path on a side of said straight-line helical path that is closer to said tip, said thread being further configured such that from said thread crest to said thread root, said pressure flank and said trailing flank are substantially linear and maintain a substantially constant cross-sectional shape over at least said portion of said external thread following said curved-line path.

16. The assembly of claim 15, said external thread on said shank having straight-line thread portions on opposite sides of said portion following a curved-line path.

17. The assembly of claim 15, said portion of said external thread comprising a single revolution within said helical pattern.

18. The assembly of claim 15, said portion of said external thread comprising multiple revolutions within said helical pattern.

19. The assembly of claim 15, said portion of said external thread including axially aligned segments of consecutive revolutions in opposite segments of wave phases.

* * * * *